United States Patent [19]

Calfo et al.

[11] 4,152,615
[45] May 1, 1979

[54] END IRON AXIAL FLUX DAMPER SYSTEM

[75] Inventors: Raymond M. Calfo, Pittsburgh, Pa.; Larry D. Vanek, Mentor, Ohio

[73] Assignee: Westinghouse Electric Corp., Pittsburgh, Pa.

[21] Appl. No.: 806,403

[22] Filed: Jun. 14, 1977

[51] Int. Cl.² ............................................. H02K 1/12
[52] U.S. Cl. ...................................... 310/256; 310/58
[58] Field of Search ................... 310/256, 260, 52, 54, 310/58, 59, 60, 65, 64; 336/84, 84 M

[56] References Cited

U.S. PATENT DOCUMENTS

| | | | |
|---|---|---|---|
| 1,645,070 | 10/1927 | Pohl | 310/256 |
| 1,689,187 | 10/1928 | Pohl | 310/256 |
| 1,816,795 | 7/1931 | Pohl | 310/256 |
| 2,618,756 | 11/1952 | Fechheimer | 310/65 |
| 2,795,714 | 6/1957 | Baudry | 310/256 |
| 3,435,262 | 3/1969 | Bennett | 310/54 |
| 3,447,002 | 5/1969 | Rönnevig | 310/65 |
| 3,745,395 | 7/1973 | Koechlin | 310/260 |

*Primary Examiner*—R. Skudy
*Attorney, Agent, or Firm*—F. J. Baehr, Jr.

[57] ABSTRACT

Disclosed is an alternating current dynamoelectric machine which has damper plates of low resistivity material over the ends of the stator's tooth region to prevent axial flux from entering the stator's core. This invention also provides for cooling of the damper plates by the inclusion of cooling ducts within the damper plates. The flow of cooling fluid through the ducts cools the damper plates and also the end region of the dynamoelectric machine.

2 Claims, 4 Drawing Figures

END IRON AXIAL FLUX DAMPER SYSTEM

BACKGROUND OF THE INVENTION

1. Field of the Invention

This invention relates to dynamoelectric machines with damper plates over the stator tooth end region.

2. Description of the Prior Art

Eddy current losses due to the axial components of stator end region magnetic fields has always been a troublesome area in the design of large dynamoelectric machines. Historically, the problem was managed in the tooth area by using a stepback construction of a laminated magnetizable end shield for reducing to a low value the eddy current losses. Refer to U.S. Pat. No. 2,795,714 issued on June 11, 1957.

In U.S. Pat. No. 3,435,262 issued Mar. 25, 1969 there was disclosed an alternating current generator with a copper screen over the strator core end plate. A separate arrangement of cooling ducts for the flow of a cooling fluid for cooling the screens, the end plates and also the teeth in the end plates was disclosed.

SUMMARY OF THE INVENTION

Disclosed is a dynamoelectric machine having a generally tubular-shaped stator. The stator being of a general type of construction that is currently used with a plurality of alternating slots and teeth around its inner periphery. The slots are for the installation of magnet coil windings. An end plate assembly which comprises an annular plate with a plurality of damper plates of low resistivity material is placed on each end of the stator over the tooth area. Within each damper plate there is located a cooling duct for the passage of cooling fluid. Cooling fluid is brought in from an input manifold to a first damper plate. Each damper plate is connected in series around the circumference of the end plate assembly. An output manifold is connected to the last damper plate in the series for removing the cooling fluid, thus providing the ability to circulate cooling fluid through the damper plates.

The damper plates are either annular sections or have a trapezoidal shape and are designed to fit in channels machined on the inner surface of the end plate.

This invention enables the ratings and machine sizes to increase as eddy current heating will be greatly reduced.

BRIEF DESCRIPTION OF THE DRAWINGS

The invention will be more fully understood from the following detailed description, taken in connection with the accompanying drawings, in which.

DESCRIPTIONS OF THE PREFERRED EMBODIMENTS

Figure 1:
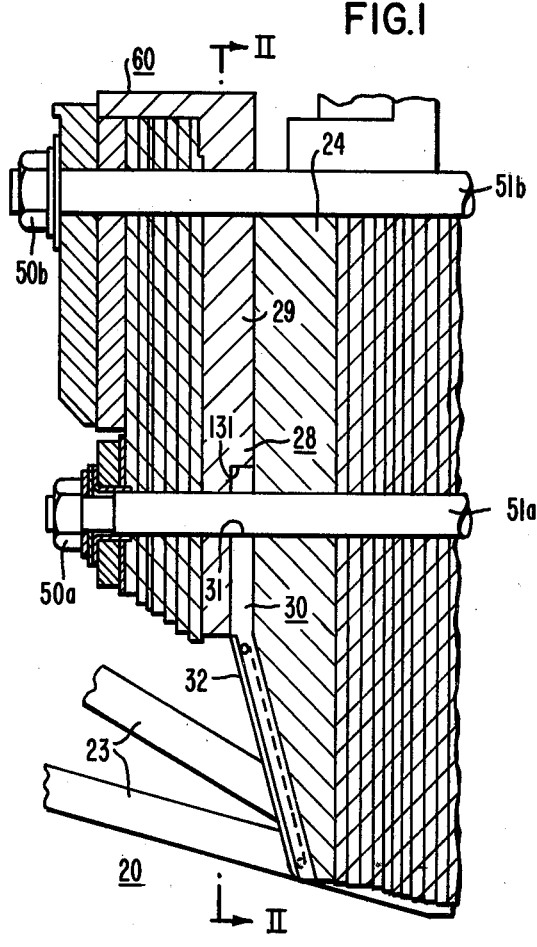
FIG. 1 is a simplified longitudinal sectional view of the top half of one end of a machine embodying the invention.
Figure 2:
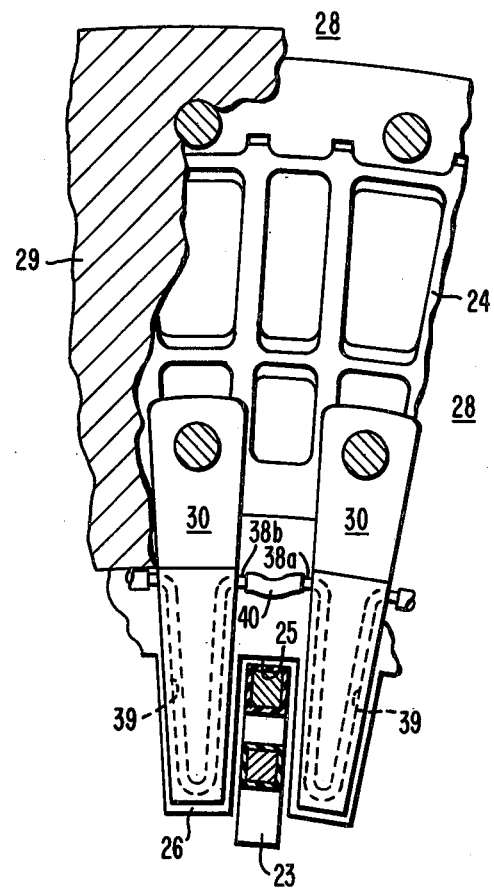
FIG. 2 is a fragmentary end view of the finger plate which shows the damper plates and a section of the end plate, as seen from section line II—II of FIG. 1.

FIG. 1 shows a simplified longitudinal sectional view of the top half of one end of a dynamoelectric machine 20 having a stator core assembly 22 with a plurality of slots around its inner periphery in which there is disposed the stator winding 23. On each end of the stator core is a finger plate 24 having a plurality of slots 25 and teeth 26 as indicated in FIG. 2. Referring back to FIG. 1, covering the finger plates on each end is an end plate assembly 28 and a magnetic shield 60. The stator assembly 20 is held together by a plurality of fastener assemblies 50A located around its outer periphery and extending longitudinally through the stator assembly.

The end plate assembly, which is mounted and held in place by fastener assemblies 50B on each end of the stator assembly, includes an end plate 29 with a plurality of channels 131 machined on its inner surface for retaining a plurality of damper plates 30. Each damper plate is made of low resistivity material such as copper and is used to provide a magnetic shield for the stator's tooth area. The eddy currents that are induced in this plate will produce a counter (magnetomotive force) (mmf) which will reduce drastically the axial flux reaching the stator's tooth's iron by diverting it radially into the end shield which is a low loss direction, and therefore reduce any eddy current losses.

Figure 3:
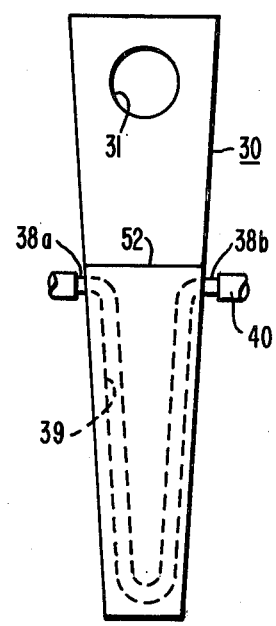
FIG. 3 is an end view of a damper plate.
Figure 4:
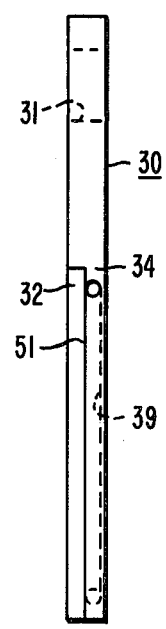
FIG. 4 is a side view of the damper plate.

The eddy currents that are induced in the damper plate will create losses which must be dissipated to maintain acceptable temperature. This is accomplished by having a U-shaped cooling duct 39 machined in the tooth area of the damper plate (FIGS. 2, 3 and 4). On each side of the damper plate is an input conduit 38A and an output conduit 38B.

The damper plate may be an annular section shape as shown in FIG. 2 or a trapezoidal shape as shown in FIG. 3.

Refer to FIGS. 2, 3 and 4. It has been found that the cooling is more effective when the cooling duct is machined in the damper plate next to the surface that is contiguous to the finger plate's outer surface. Therefore, the duct is machined on the bottom portion of the damper plate 34 and a top plate 32 is brazed on, forming the close duct 39. The junction of the top plate 32 and bottom plate 34 is represented by lines 51 and 52. Note that the cooling ducts are located close to the finger plate's inner surface to facilitate cooling of the stator tooth's end region as shown in FIG. 4.

The end plate will have channels 131 machined around its inner periphery that are designed to receive the damper plates. These channels will either be shaped as an annular-section or a trapezoid, depending upon the type of damper plate used. Each damper plate has a fastener clearance hole 31 through which fastener assembly 50A (FIG. 1) passes compressing the damper plates between the end plate and the finger plate.

When the damper plate assembly is installed on the dynamoelectric machine, each input conduit 38A of each damper plate is connected to the output of the preceding damper plate by hose means 40. The connecting hose may be a plastic hose made out of a material such as Teflon or a metal such as copper. All of the cooling ducts of the damper plates are connected in series around the periphery of the stator. At one point the series is broken wherein an input duct (not shown) brings in cooling fluid from an input manifold (not shown). An output duct (not shown) is connected between an output manifold (not shown) and the output conduit of the damper plate located next to the damper plate where the input conduit is connected.

Because there are two variations of finger plate assemblies and because the damper plates must fit flush over and in alignment with the finger ring assembly tooth area, there are two variations of the damper plates shown. One variation is when the finger plate has a taper inward toward the stator bore, in which case damper plate will be tapered so that it lays flush against the taper of the finger plate. This is shown in FIG. 1. In the other variation, where the finger plate has no taper present, then correspondingly neither will the damper plate, as shown in FIG. 4.

We claim:

1. A dynamoelectric machine with a generally tubular shaped stator, said stator comprising:

a generally tubular-shaped core section which includes a plurality of laminated segments with a plurality of slots alternating with a plurality of teeth around said core's inner periphery;

on each end of said laminated segments is a finger plate with a plurality of slots alternating with a plurality of teeth around said plate's inner periphery and said finger plate's teeth being positioned over and in alignment with said core section's teeth;

located over the outer face of each finger plate is an end plate assembly which comprises of an annular end plate that covers the outer annular portion of said finger plate and a plurality of low resistivity damper plates, the bases of said damper plates being clamped between said end plate and said finger plate and extending radially inward beyond the inner circumference of said annular end plate toward the center of said stator, each damper plate being sized such that it fits flush over and in alignment with said finger plate's teeth; and located within each of said damper plates are cooling ducts for the passage of cooling fluid, said cooling ducts are connected in series around the circumference of said stator's core; said series being broken at one point and connected to a cooling input manifold by an input duct and the other point of said series being connected to output manifold by an output duct facilitating the flow of cooling fluid through said damper plates' ducts.

2. A dynamoelectric machine with a generally tubular shaped stator with a rotor mounted within said stator and comprising:

a generally tubular-shaped core section which includes a plurality of laminated segments with a plurality of slots alternating with a plurality of teeth around said core's inner periphery;

on each end of said segments is a finger plate with a plurality of slots alternating with a plurality of teeth around said plate's inner periphery and said finger plate's teeth being positioned over and in alignment with said core section's teeth;

located over the outer face of each finger plate is an end plate assembly which comprises of an annular end plate that covers the outer circumference of said finger plate, a plurality of low resistivity damper plates of a trapezpoidal-shaped sections, the base of which fits between said annular end plate and said finger plate, and extends radially inwards beyond the inner circumference of said annular end plate towards the center of said stator, each damper plate being sized such that it fits flush over and in alignment with said finger plate's teeth; and located within each of said damper plates are cooling ducts for the passage of cooling fluid, said cooling ducts being connected in series around the circumference of said stator's core; said series being broken at one point and connected to a cooling input manifold by an input duct and the other point being connected to output manifold by an output duct facilitating the flow of cooling fluid through said damper plates' ducts.

* * * * *